May 5, 1964 J. J. WRIGHT 3,132,247
RADIOACTIVE WEIGHING SYSTEM FOR MOVING VEHICLES
Filed Nov. 2, 1959 2 Sheets-Sheet 1

INVENTOR.
JAMES J. WRIGHT
BY *Bosworth, Sessions,*
*Herrstrom & Knowles*
ATTORNEYS.

May 5, 1964  J. J. WRIGHT  3,132,247
RADIOACTIVE WEIGHING SYSTEM FOR MOVING VEHICLES
Filed Nov. 2, 1959  2 Sheets-Sheet 2

INVENTOR.
JAMES J. WRIGHT
BY
ATTORNEYS.

United States Patent Office 3,132,247
Patented May 5, 1964

3,132,247
RADIOACTIVE WEIGHING SYSTEM FOR MOVING VEHICLES
James J. Wright, Bratenahl, Cleveland, Ohio, assignor, by mesne assignments, to Cleveland Technical Center, Inc., Cleveland, Ohio, a corporation of Delaware
Filed Nov. 2, 1959, Ser. No. 850,318
6 Claims. (Cl. 250—83.3)

This invention relates to methods of and means for weighing moving vehicles, particularly railway freight cars.

Heretofore, the weighing of railway freight cars has been accomplished by means of instrumented track scales. Such scales are expensive to install and maintain. Their use requires uncoupling the cars and weighing them separately. Such weighing can be done only when the car is standing still or moving at a very low rate of speed. Although the results are sufficiently accurate for most purposes, they are affected by factors such as vibration, coupler reaction forces, etc.

It has been found that when the hereinafter described system of weighing is employed, railway freight cars may be weighed while in motion at speeds up to 30 miles per hour without uncoupling the cars. An investment in the neighborhood of one fourth of that required for an instrumented track scale is all that is needed for a comparable installation. Maintenance is simple and cheap. Determination of car weights may be made with sufficient accuracy to enable comparison with weights reported in way bills, to permit the side-tracking of overweight cars, and to load underweight cars to provide for optimum operation.

This system of weighing depends on the fact that high energy radiation such as that emitted by certain radioactive isotopes is but incompletely absorbed by an object intervening between the radiation source and suitable detection apparatus. Absorption is a function of the mass of the intervening object. Notwithstanding the presence of such intervening object, part of the radiation emitted by the source strikes through it to reach the detection apparatus. Thus it becomes possible to determine by difference the amount of primary radiation lost by absorption.

With a load of uniform depth and physical characteristics such as coal, sand or iron ore in a freight car with a flat bottom, the amount of absorbed radiation is directly related to the weight of the car and load. Knowing the dimensions and weight of the car, a single measurement of primary radiation reaching the detection apparatus from a radiation source of known characteristics will allow ready calculation of the weight of the load. With a mixed load reaching to different heights in the same car, multiple determinations can be made, preferably taking the form of a number of parallel series. For practical purposes, these can be combined in consequence of the fact that mass absorption coefficients in the case of most common materials do not vary greatly from each other, usually less than 10% from the average in either direction.

This makes its possible with suitable radiation sources and suitable detection apparatus to pick up meaningful signals from a freight car moving at a known speed. Preferably, the radiation sources and detection apparatus are so related as to furnish signals at intervals of one foot across the width of the car. Like signals may be obtained at uniform time intervals as the car moves through the radiation zone. If obtained by electronic means, these signals may be amplified, fed into logarithmic circuits, and integrated to give a value which represents the total mass. Assuming that the mass of the car is known or can be readily determined, subtraction of the latter value from the former provides valuable information regarding the weight of the load itself.

These features of the invention will be further described below with reference to a railway installation, but mention should first be made of the fact that the objects of the invention include the provision of ways and means for determining weights of land vehicles of all kinds, even when moving at speeds up to and beyond 30 miles per hour. Another object of the invention contemplates making such determinations without separating coupled vehicles from each other. Still another object contemplates furnishing the desired information in form suitable for presentation in visual fashion, as by a recorder or read-out apparatus. By making use of the principles underlying the invention, explained in the preceding paragraphs, these objects may be achieved in a variety of ways.

Other objects, advantages and features of the invention will be apparent from the description which follows and from the accompanying drawings, in which.

Figure 1:
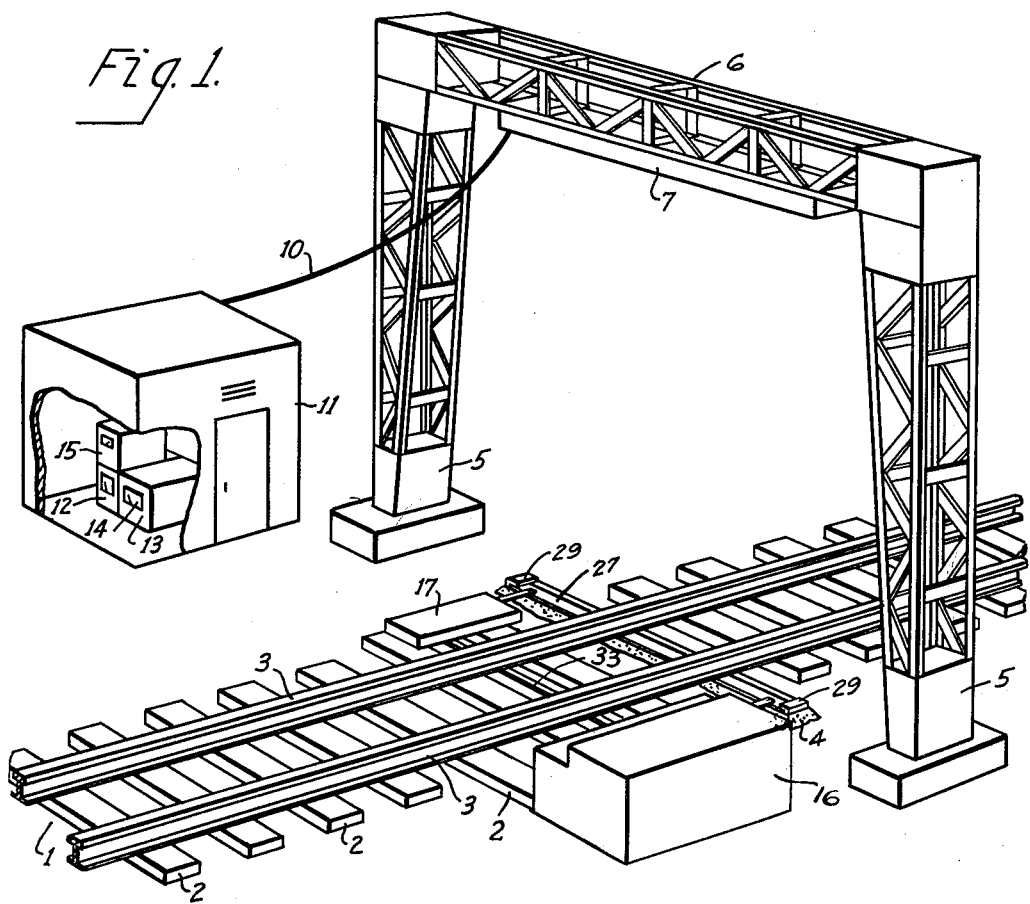
FIGURE 1 is a perspective of an installation for weighing vehicles traveling on tracks, such as railway cars.
Figure 2:
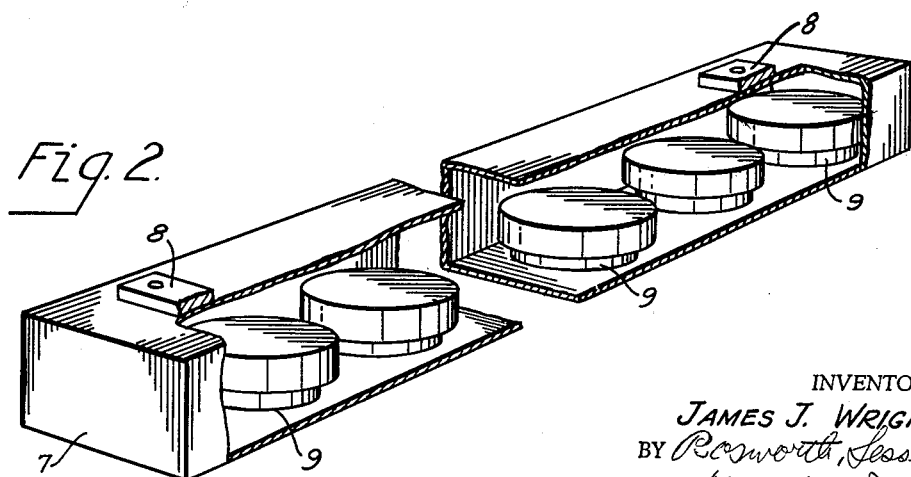
FIGURE 2 is a perspective of a representative detector assembly, the same being shown partly broken away in order to reveal the combined detector and pre-amplifier units forming part of the assembly as a whole.

In the installation shown in FIGURE 1, roadbed 1 is provided with cross ties 2 and rails 3 for a wheeled railway vehicle. The latter may take the form of a locomotive, freight car, baggage car or train made up of a locomotive and a series of cars. Embedded in or otherwise anchored to roadbed 1 is a suitable concrete vault 4 containing a series of as many as ten or more independent sources of high energy radiation, sometimes collectively referred hereinafter to as "the radiation source." Straddling roadbed 1 is a structure consisting of two supporting columns 5 and an overhead connecting bridge 6. The latter carries the detector assembly 7 illustrated in greater detail in FIGURE 2.

Detector assembly 7, which is held in place on the lower face of bridge 6 by means of brackets 8, is provided with a series of individual detector units 9 equal in number to and located directly above the several radiation sources in vault 4. Although detector units of other types may be used, it is preferable for purposes of the present invention to employ detector units consisting of scintillation detectors with coupled pre-amplifiers. Scintillation detectors provided with pre-amplifiers not only are well known and understood but are readily available commercially.

A cable 10, seen in FIGURE 1, carries the signals in suitable channels to a group of instruments in shelter 11. The latter may be located in any desired relation to the rest of the installation. If desired, it may be at a point far removed from detector assembly 7. In a typical case, the instruments housed in shelter 11 include such units as an electronic integrator 12 utilizing log circuits, a recorder or read-out apparatus 13 with a visual indicator 14, and a power pack 15 connected to the leads from a conventional 110-volt or 220-volt source of electrical current. Compatible instruments of other kinds may be employed with or in lieu of those mentioned.

Figure 4:
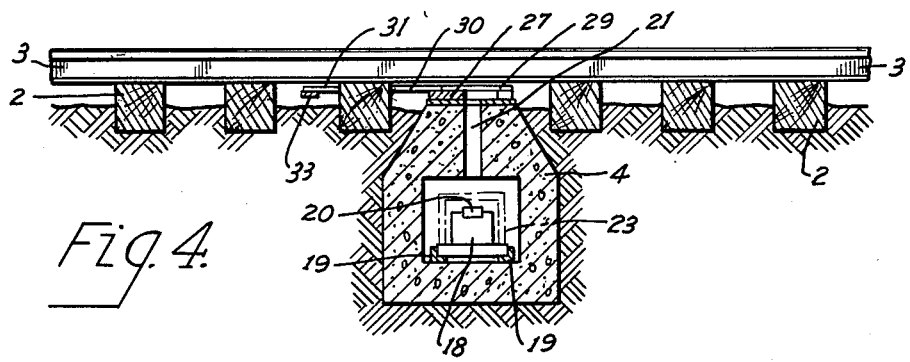
FIGURE 4 is a section on line 4—4 of FIGURE 3.

Referring now to FIGURE 4, the individual sources of radiation are represented by radiation unit 18, which is shown in elevation in diagrammatic fashion. There may be as many as ten or more of these units, preferably mechanically interconnected to make it possible to move them together into and out of position in vault 4. To this end, the units are supported on angle irons 19 which run lengthwise of the vault from one end to the other.

Each unit is provided with a collimator 20. Within each unit is a suitably mounted source of high energy radiation such as a 10.2 Curie mass of cobalt 60 producing 1.33 mev. gamma radiation. Aligned with the latter and with collimator 20 is an opening 21 through the top of vault 4. This opening is of the nature of a slot extending lengthwise of the vault. Thus high energy radiation from the source is only partially contained by the vault, being permitted to escape through slot 21 when the installation is in use.

In order that best results may be obtained, detector assembly 7 should be directly above slot 21, the distance between them being some convenient distance which in a typical case may be from 15 to 20 feet.

Radiation escaping through slot 21 will strike through an intervening object such as a freight car and that portion that is not absorbed will impinge on the sensing elements forming part of the detector units 9 in detector assembly 7. In passing through a freight car or other intervening vehicle, a considerable part of the high energy radiation escaping from the vault will be degraded as a result of various scattering and absorption processes into radiation of a lower energy content. Since not all of this lower energy radiation is absorbed, it is necessary, as well as feasible from the standpoint of those skilled in the art, to construct the detectors and associated elements of the electronic system in such manner that only that radiation is detected which passes without loss of energy through the intervening object. By responding to non-absorbed radiation, detector assembly 7 gives an indication of the mass of material beneath it.

Mention has already been made of the fact that the series of radiation units is supported on two angle irons 19 extending lengthwise of vault 4. This arrangement permits sliding the units into and out of place. Access to the interior of the vault is had through a door 22 in the vault end. See the dotted line showing at the bottom of FIGURE 3. When, for purposes of maintenance, workmen must come into close proximity to the vault for any considerable length of time, the entire series of units is withdrawn through door 22 in the vault end. The series is first covered with a movable lead shield 23 of channel-shaped configuration; see FIGURE 4.

In order to close off slot 21 against the escape of radiation during those times when no vehicle is passing through the installation, vault 4 is provided with a slidable closure 27 constructed of suitable material. Closure 27 is equipped at its ends with legs 28 cooperating with guides 29 mounted on the vault itself. It is biased toward closed position by an assembly consisting of two links 30, two bell crank levers 31 pivoted as at 32, and a connecting bar 33 reciprocated by a crank arm 34 connected to one of the levers 31. Crank arm 34 is actuated through a small arc by a collar 35 rigidly mounted on a vertically standing shaft 36 connected to a geared-down prime mover.

In the form of the invention shown, the latter consists of an electric motor 37 connected to gear box 38 housing a set of reducing gears developing a partial revolution only of the output shaft, a magnetic clutch 39, and a counter balanced drive shaft 40 for transmitting power to vertical shaft 36 through bevel gears 41, 42. Mounted on an arm 43 on drive shaft 40 is an adjustable weight 44 biasing closure 27 toward closed position. In the event of power failure or motor trouble, clutch 39 is released, thus permitting closure 27 to move into position over slot 21 in vault 4. This arrangement provides "failsafe" operation of closure 27.

With the exception of closure 27 and connecting bar 33, the mechanical elements described in the immediately preceding paragraphs are largely protected by housings 16 and 17 on platforms 16a and 17a, respectively.

In operation, track switches of conventional construction (not shown) are actuated by an approaching railway vehicle such as a locomotive to cause energization of motor 37, resulting in movement of closure 27 into open position. Detector units 9, which are coupled to a high voltage source of electricity, are energized at the same time. Thereafter, detector units 9 pick up high energy radiation escaping through slot 21 in vault 4, which varies in amount as previously explained depending on the mass of the vehicle intervening between vault 4 and bridge 6. The scintillation detectors incorporated in detector units 9 provide a measure of the rate of reception of high energy radiation. By appropriate control apparatus, detector units 9 can be made to operate periodically at short time intervals corresponding, for example, to one foot of travel of a vehicle moving at a constant rate. By means of other track switches of conventional construction (not shown) motor 37 and detector units 9 are de-energized when the vehicle to be weighed has passed through the radiation zone.

If desired, photo-sensitive cells and other instruments may be provided to measure the length and speed of the vehicle.

In lieu of the scintillation detectors incorporated in detector units 9, other means of detection may be employed, although scintillation counters are preferred because they provide a measure of the rate of impingement of non-absorbed radiation on the detection apparatus. Counting rate monitors may be added, if desired. In place of individual radiation sources making use of discrete masses of cobalt 60, it is possible to provide a continuous source extending lengthwise of vault 4. In place of cobalt 60, other radioactive isotopes may be used, as may apparatus capable of producing high energy X-rays.

Figure 3:
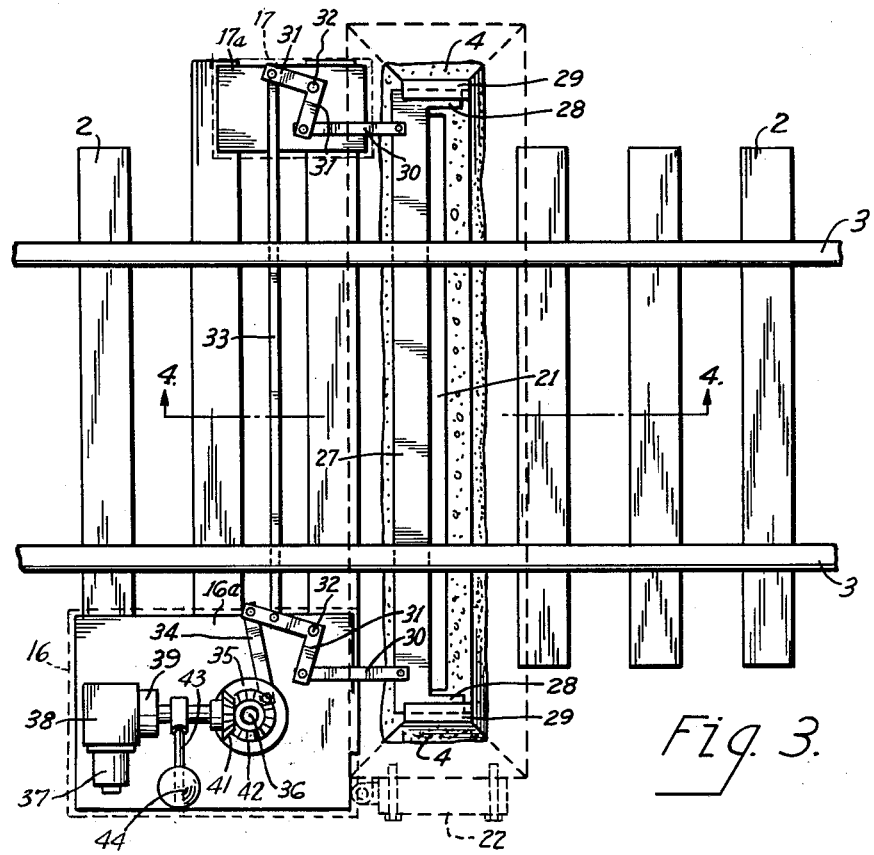
FIGURE 3 is a plan of a representative radiation source, including mechanism for retracting the closure.

It is not necessary that vault 4 be embedded in the roadbed as shown in FIGURES 1, 3 and 4; it may, if desired, be attached to a trestle. It is likewise not necessary that the vault be associated with the roadbed and the detection assembly with an overhead structure; if desired, the locations of these assemblies may be reversed with the vault carried by the overhead structure and the detection assembly incorporated in the roadbed. It is also possible, if desired, to mount the two units vertically, one on one of the two columns supporting the overhead structure and the other on the other column. It is evident that the principles of the invention may be applied to weighing of other vehicles than those operating on tracks; for example, the invention may be applied to weigh loaded trucks and other vehicles, whether or not wheeled.

It is intended that the patent shall cover, by summarization in appended claims, all features of patentable novelty residing in the invention.

What is claimed is:

1. A system for measuring the weight of moving vehicles of definite, discrete length comprising a roadway; a source of high-energy radiation arranged in such relation to the roadway that a moving vehicle can pass over it without producing interference between them other than that occasioned by attenuation of the radiation; an overhead supporting structure carrying a detector of high-energy radiation at a level high enough to avoid mechanical interference from a vehicle therebeneath, said detector being so disposed in relation to the source that radiation emitted by the source can be detected thereby; and means coupled to the detector for revealing the amount of such radiation impinging on the detector during the time when the vehicle passes beneath it.

2. A system for measuring the weight of moving vehicles of definite, discrete length comprising a roadway; a source of high-energy radiation enclosed in a vault set into the bed of the roadway in such manner that a moving vehicle can pass over it without producing interference between them other than that occasioned by attenuation of the radiation; an overhead supporting structure carrying a detector of high-energy radiation at a level high enough to avoid mechanical interference from a vehicle therebeneath, said detector being so disposed in relation to the source that radiation emitted by the source can be detected thereby; and means coupled to the detector for revealing the amount of such radiation impinging on the detector during the time when the vehicle passes beneath it.

3. A system according to claim 2 in which the vault is provided with a top opening directly beneath the overhead supporting structure.

4. A system for measuring the weight of moving railway vehicles of definite, discrete length comprising a railway roadbed; a supporting structure above the roadbed; a detector of high energy radiation mounted on one of them; a partially shielded source of high energy radiation mounted on the other; a closure for selectively preventing or permitting escape of high energy radiation from the source; and means coupled to the detector for revealing the rate at which high energy radiation is received from the source by the detector during the time when a vehicle is passing between the source and the detector.

5. A system for measuring the weight of a moving freight car of definite length comprising a railway roadbed; a partially shielded source of high energy radiation disposed in such relation to the roadbed that a moving freight car can pass over said source without producing mechanical interference between them; movable means for selectively preventing or permitting the escape of radiation from said source; an overhead structure provided with means for detecting high energy radiation from said source, said detecting means being so organized that extraneous radiation is of no effect thereon; and, coupled to the detecting means, visual means revealing the extent of impingement on said detecting means of high energy radiation from said source.

6. A system for measuring the weight of a moving freight car of definite length comprising a railway roadbed; a partially shielded source of high energy radiation disposed in such relation to the roadbed that a moving freight car can pass over said source without producing mechanical interference between them; movable means for selectively preventing or permitting the escape of radiation from said source; an overhead structure provided with means for detecting high energy radiation from said source, said detecting means being so organized that extraneous radiation is of no effect thereon; and, coupled to the detecting means, a recorder revealing the extent of impingement on said detecting means of high energy radiation from said source.

References Cited in the file of this patent

UNITED STATES PATENTS

| | | |
|---|---|---|
| 2,670,443 | Pennock et al. | Feb. 23, 1954 |
| 2,763,790 | Ohmart | Sept. 18, 1956 |
| 2,856,539 | Orthurber et al. | Oct. 14, 1958 |
| 2,880,309 | Gallagher et al. | Mar. 31, 1959 |
| 2,922,888 | Faulkner et al. | Jan. 26, 1960 |

FOREIGN PATENTS

| | | |
|---|---|---|
| 678,369 | Great Britain | Sept. 3, 1952 |

OTHER REFERENCES

Radioactive Snow Gage With Telemetering System, by John A. Doremus, from Proceedings of the National Electronics Conference, vol. 6; 1950; pp. 518 to 526.

Weighing Bagasse and Sugar With Gamma Ray, by Burr et al., from Hawaiian Sugar Technologists, 1954; pp. 124 to 126.